United States Patent [19]

Takahashi

[11] Patent Number: 5,910,540
[45] Date of Patent: Jun. 8, 1999

[54] THERMOPLASTIC ELASTOMER COMPOSITION AND COMPOSITE MOLDED PRODUCT

[75] Inventor: Hideki Takahashi, Mie, Japan

[73] Assignee: Mitsubishi Chemical Corporation, Tokyo, Japan

[21] Appl. No.: 08/734,600

[22] Filed: Oct. 22, 1996

[30] Foreign Application Priority Data

Nov. 6, 1995 [JP] Japan .................................... 7-287245

[51] Int. Cl.$^6$ ............................. C08L 53/02; C08L 67/02; C08L 75/04; C08L 77/00
[52] U.S. Cl. ..................... 525/92 B; 525/92 C; 525/92 F
[58] Field of Search ................................. 525/92 F, 92 B, 525/92 C

[56] References Cited

U.S. PATENT DOCUMENTS

| | | | |
|---|---|---|---|
| 4,994,508 | 2/1991 | Shiraki | 525/92 F |
| 5,002,625 | 3/1991 | Naritomi | 156/245 |
| 5,149,589 | 9/1992 | Naritomi | 428/412 |
| 5,439,976 | 8/1995 | Kinoshita | 525/92 F |

OTHER PUBLICATIONS

Hytrel 4056, Dupont product bulliteu HYT–102A.

*Primary Examiner*—Patricia A. Short
*Attorney, Agent, or Firm*—Oblon, Spivak, McClelland, Maier & Neustadt, P.C.

[57] ABSTRACT

The present invention relates to a thermoplastic elastomer composition comprising the following components (A) and (B), and to a composite molded product comprising a resin layer and an elastomer layer containing said composition as the base material. Component (A): 5 to 95% by weight of a styrene type block copolymer or a hydrogenated product thereof, comprising block (a) which is made of a polymer of styrene or a derivative thereof, and block (b) which is made of an isoprene homopolymer or a copolymer of isoprene and butadiene, wherein the total amount of the 1,2-bond and the 3,4-bond in the isoprene polymer part in block (b) is not less than 40% of the total isoprene bond unit. Component (B): 95 to 5% by weight of one or more thermoplastic elastomers which are selected from the group consisting of polyester type thermoplastic elastomers, polyamide type thermoplastic elastomers, and polyurethane type thermoplastic elastomers. The composition of the present invention exhibits excellent heat fusion properties to both an olefin type resin and a nonolefin type resin, and gives a composite molded product having a high peeling strength, comprising said resin and said elastomer.

11 Claims, 1 Drawing Sheet

THERMOPLASTIC ELASTOMER COMPOSITION AND COMPOSITE MOLDED
PRODUCT

BACKGROUND OF THE INVENTION

1. Field of the Invention

The present invention relates to a thermoplastic elastomer composition with excellent heat fusion properties which can be bonded not only to a layer of an olefin type resin represented by a propylene type resin, but also to a layer of a nonolefin type resin such as an aromatic polycarbonate, acrylic resin, styrene type resin, vinyl chloride type resin, and a modified polyphenylene ether resin, to a composite molded product produced therefrom, and to a process for producing said composite molded product.

2. Description of the Prior Art

Conventionally, when (1) a crystalline olefin type resin layer and a polyester type thermoplastic elastomer, polyamide type thermoplastic elastomer or polyurethane type thermoplastic elastomer are to be combined together to produce a laminate, or (2) a nonolefin type resin layer such as an aromatic polycarbonate, acrylic type resin, and styrene type resin and an olefin type thermoplastic elastomer or styrene type thermoplastic elastomer are to be combined together to produce a laminate, since they are a combination of materials which can not be fusion-bonded together, such methods have been employed to produce composite products therefrom. In such methods, a combination of a recess and a projection are provided at the joint of the two different materials, a core material is partially covered with a surface material, or a hole is provided in a core material so that a surface material reaches the back side, to thereby bond them together mechanically, or an adhesive such as a primer is applied on the joint to make them into a composite molded product.

Accordingly, the resulting composite molded product has such problems as poor bonding strength between both layers, overly complicated structure or too many production steps.

As an attempt to solve such a problem, a method has been proposed in which an elastomer having polarity such as a polyester type thermoplastic elastomer, polyamide type thermoplastic elastomer, or polyurethane type thermoplastic elastomer is added to a nonpolar elastomer such as an olefin type thermoplastic elastomer, styrene/ethylene/butylene/styrene copolymer (hereinafter also simply abbreviated as "SEBS"), or styrene/ethylene/propylene/styrene copolymer (hereinafter also simply abbreviated as "SEPS"), as described in U.S. Pat. Nos. 5,002,625 and 5,149,589, or Japanese Patent Laid-open Nos. 2-147306 and 6-65467.

However, according to the method in which a polyester type thermoplastic elastomer, polyamide type thermoplastic elastomer or polyurethane type thermoplastic elastomer is added to an olefin type thermoplastic elastomer, SEBS or SEPS, the polyester type thermoplastic elastomer, polyamide type thermoplastic elastomer or polyurethane type thermoplastic elastomer is added in an increased amount that the resulting heat fusion property to the nonolefin type resin layer becomes satisfactory, the heat fusion property to the crystalline olefin type resin layer becomes almost nothing on the contrary.

Thus it has been difficult to carry out heat fusion to both the crystalline olefin type resin layer and the nonolefin type resin layer, and 1) heat fusion to the nonolefin type resin layer requires the olefin type thermoplastic elastomer, SEBS or SEPS to which the polyester type thermoplastic elastomer, polyamide type thermoplastic elastomer or polyurethane type thermoplastic elastomer is added, while 2) heat fusion to the crystalline olefin type resin layer requires a normal olefin type thermoplastic elastomer or styrene type thermoplastic elastomer; and this situation has led to such problems as a complicated molding process and a misuse of the molding material.

It has also been impossible to produce a composite molded product with a three layer structure comprising a nonolefin type resin layer/thermoplastic elastomer layer/crystalline olefin type resin layer.

SUMMARY OF THE INVENTION

An object of the present invention is therefore to provide a thermoplastic elastomer composition containing a specific styrene type block copolymer which has good heat fusion properties in regards to both olefin type resins and nonolefin type resins. Another object of the present invention is to provide a composite molded product of a three layer structure comprising nonolefin type resin layer/thermoplastic elastomer composition layer/crystalline olefin type resin layer, and a process for producing this molded product.

The thermoplastic elastomer composition according to one aspect of the present invention (aspect 1) comprises the following components (A) and (B).

Component (A): 5 to 95% by weight of a styrene type block copolymer or a hydrogenated product thereof, comprising block (a) which is made of a polymer of styrene or a derivative thereof, and block (b) which is made of an isoprene homopolymer or a copolymer of isoprene and butadiene, wherein the total amount of the 1,2-bond and the 3,4-bond in the isoprene polymer part in block (b) is not less than 40% of the total isoprene bond unit.

Component (B): 95 to 5% by weight of one or more thermoplastic elastomers which are selected from the group consisting of polyester type thermoplastic elastomers, polyamide type thermoplastic elastomers, and polyurethane type thermoplastic elastomers.

The composite molded product according to another aspect of the present invention (aspect 2) comprises a thermoplastic resin layer (I) having a bending modulus of 2,000 to 60,000 kg/cm$^2$, comprising a crystalline olefin type resin or nonolefin type resin, and a thermoplastic elastomer layer (II) having a bending modulus of less than 2,000 kg/cm$^2$ and a JIS Shore hardness (A scale) according to JIS-K6301 of not more than 98, wherein said thermoplastic elastomer layer (II) comprises the following components (A) and (B).

Component (A): 5 to 95% by weight of a styrene type block copolymer or a hydrogenated product thereof, comprising block (a) which is made of a polymer of styrene or a derivative thereof, and block (b) which is made of an isoprene homopolymer or a copolymer of isoprene and butadiene, wherein the total amount of the 1,2-bond and the 3,4-bond in the isoprene polymer part in block (b) is not less than 40% of the total isoprene bond unit.

Component (B): 95 to 5% by weight of one or more thermoplastic elastomers which are selected from the group consisting of polyester type thermoplastic elastomers, polyamide type thermoplastic elastomers, and polyurethane type thermoplastic elastomers.

The composite molded product according to still another aspect of the present invention (aspect 3) is a composite molded product in which one or more thermoplastic resin layers selected from aromatic polycarbonates, acrylic type resins and styrene type resins are laminated with a propylene type resin layer through a thermoplastic elastomer composition layer (intermediate layer) comprising the following components (A) and (B).

Component (A): 5 to 95% by weight of a styrene type block copolymer or a hydrogenated product thereof, comprising block (a) which is made of a polymer of styrene or a derivative thereof, and block (b) which is made of an isoprene homopolymer or a copolymer of isoprene and butadiene, wherein the total amount of the 1,2-bond and the 3,4-bond in the isoprene polymer part in block (b) is not less than 40% of the total isoprene bond unit.

Component (B): 95 to 5% by weight of one or more thermoplastic elastomers which are selected from the group consisting of polyester type thermoplastic elastomers, polyamide type thermoplastic elastomers, and polyurethane type thermoplastic elastomers.

The process for producing the composite molded product according to yet another aspect of the present invention (aspect 4) is a production process employing insert injection molding, double injection molding, or core back injection molding in which a thermoplastic resin having a bending modulus of 2,000 to 60,000 kg/cm$^2$ is molded first then a thermoplastic elastomer layer having a JIS Shore hardness (A scale) according to JIS-K6301 of not more than 98, and a bending modulus of below 2,000 kg/cm$^2$ is molded by injection molding process, characterized in that the thermoplastic elastomer layer basically contains a thermoplastic composition comprising the following components (A) and (B), and that the thermoplastic elastomer layer is fusion-bonded to the thermoplastic resin layer.

Component (A): 5 to 95% by weight of a styrene type block copolymer or a hydrogenated product thereof, comprising block (a) which is made of a polymer of styrene or a derivative thereof, and block (b) which is made of an isoprene homopolymer or a copolymer of isoprene and butadiene, wherein the total amount of the 1,2-bond and the 3,4-bond in the isoprene polymer part in block (b) is not less than 40% of the total isoprene bond unit.

Component (B): 95 to 5% by weight of one or more thermoplastic elastomers which are selected from the group consisting of polyester type thermoplastic elastomers, polyamide type thermoplastic elastomers, and polyurethane type thermoplastic elastomers.

DETAILED DESCRIPTION OF THE PREFERRED EMBODIMENT

Figure 1:
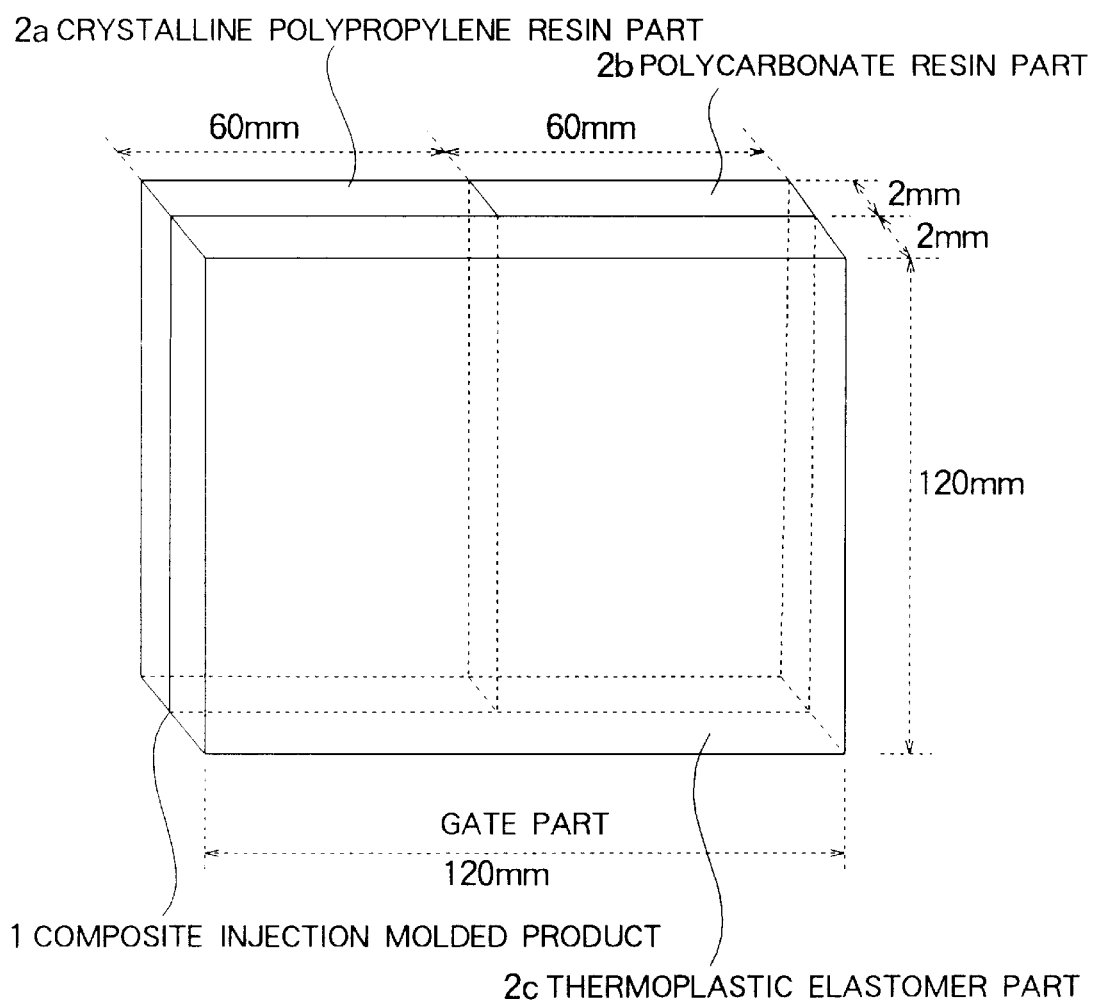
FIG. 1 is a perspective view of a composite injection molded product obtained in Example 11 of the present invention.

[I] Thermoplastic elastomer composition (1) Basic components of the thermoplastic elastomer composition The physical properties of the thermoplastic elastomer according to the present invention are; a JIS Shore hardness (A Scale) according to JIS-K6301 of not more than 98, preferably 5 to 95, particularly preferably 10 to 90, bending modulus according to JIS-K7203 of below 2,000 kg/cm$^2$, preferably not more than 1,500 kg/cm$^2$, particularly preferably 0 to 1,000 kg/cm$^2$. Such thermoplastic elastomer composition is a composition containing as its basic components, a styrene type block copolymer or a hydrogenated product thereof, comprising block (a) which is made of a polymer of styrene or a derivative thereof, and block (b) which is made of an isoprene homopolymer or a copolymer of isoprene and butadiene, wherein the total amount of the 1,2-bond and the 3,4-bond in the isoprene polymer part in the block (b) is not less than 40% of the total isoprene bond unit [hereinafter referred to as component (A)] and a specific thermoplastic elastomer [hereinafter referred to as component (B)].

<Component (A): Styrene type block copolymer>

The above-mentioned styrene type block copolymer is made of a block (a) comprising a polymer of styrene or a derivative thereof, and block (b) which is made of isoprene homopolymer or a copolymer of isoprene and butadiene, wherein the total amount of the 1,2-bond and the 3,4-bond in the isoprene polymer part in the block (b) is not less than 40%, preferably not less than 45%, particularly preferably not less than 50% of the total isoprene bond unit.

The polymer component constituting the above-mentioned block (a) is styrene or a derivative thereof and examples of the derivative of styrene include α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl) styrene and the like. Among these, styrene and α-methylstyrene are preferable as the polymer component constituting the block (a).

The polymer or the copolymer constituting the above-mentioned block (b) is an isoprene homopolymer or a copolymer of isoprene and butadiene and the total amount of the 1,2 bond and the 3,4 bond in the isoprene polymer part shown below is not less than 40% (up to 100%) of the total isoprene bond unit and the isoprene/butadiene copolymer can be either random, block or tapered.

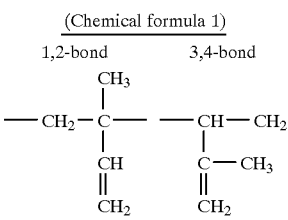

(Chemical formula 1)

The isoprene bond units in the isoprene polymer part include 1,2-bond, 3,4-bond and 1,4-bond, but according to the present invention, by the selective use of those in which the amount of the 1,2-bond and that of the 3,4-bond is not less than 40% of the total isoprene bond unit, a styrene type block copolymer having excellent heat fusion properties can be obtained.

The ratio of the polymer block (a) comprising the styrene or a derivative thereof in the styrene type block copolymer of component (A) is preferably 5 to 50% by weight of said copolymer, more preferably 10 to 45% by weight. That is, the ratio of the block (b) comprising the above-mentioned isoprene homopolymer or the copolymer of isoprene and butadiene is 95 to 50% by weight, more preferably 90 to 55% by weight.

According to the present invention, it is more preferable to use a hydrogenated styrene type block copolymer for the component (A) of the composition. As for the hydrogenation degree, it is important to use a copolymer having an overall hydrogenation degree of not less than 95% by weight, preferably 97 to 100% by weight.

As for said styrene type block copolymer, it is preferable to use those having a weight average molecular weight of 50,000 to 500,000, preferably 60,000 to 400,000, particularly preferably 70,000 to 300,000.

The term "weight average molecular weight" means a weight average molecular weight measured by gel permeation chromatography (GPC) under the following conditions that is converted to a polystyrene basis.
(Conditions) Instrument: 150 C ALC/GPC (manufactured by Millipore Corp.)
Column:AD80M/S (manufactured by Showa Denko K.K.) three columns
Solvent: o-dichlorobenzene
Temperature: 140° C.
Rate of flow : 1 ml/min
inflow: 200 μl
Concentration: 2 mg/ml (2,6-di-t-butyl-4-methylphenol was added as an antioxidant, in an amount of 0.2% by weight. The detection of the concentration was carried out at a wave length of 3.42 μm, with MIRAN 1A, an infrared spectrophotometer manufactured by the FOXBORO COMPANY.)

Among the above-mentioned styrene type block copolymers, those having a weight average molecular weight exceeding 500,000 result in a poor moldability, and those having a weight average molecular weight below 50,000 provide poor rubber elasticity and poor mechanical strength. Those having a styrene content or a styrene derivative content of less than 5% by weight result in a poor mechanical strength, and those having a content exceeding 50% by weight provide poor flexibility. Those having a hydrogenation degree of below 95% by weight show inferior weather resistance and inferior heat resistance.

The styrene type block copolymer of the present invention can be obtained by the various methods shown below.

First, examples of a method for polymerizing the styrene type block copolymer include a method in which styrene or a derivative thereof, isoprene or isoprene-butadiene is polymerized sequentially using an alkyl lithium compound as the initiator, a method in which styrene or a derivative thereof is polymerized, then isoprene or a mixture of isoprene and butadiene is polymerized and then coupled by a coupling agent, or a method in which isoprene or an isoprene-butadiene mixture, then styrene or a derivative thereof are polymerized sequentially using a dilithium compound as the initiator. Examples of an alkyl lithium include an alkyl compound having 1–10 carbon atoms in the alkyl residual group, and particularly preferable examples include methyl lithium; ethyl lithium, pentyl lithium and butyl lithium. As the coupling agent, dichloromethane, dibromomethane, dichloroethane, dibromoethane, and dibromobenzene and the like can be used. Examples of the dilithium compound include naphthalene dilithium and dilithiohexylbenzene and the like. The amount of the compound used is decided depending on the desired molecular weight. However, 0.01 to 0.2 parts by weight of an initiator, 0.04 to 0.8 parts by weight of a coupling agent are generally used for 100 parts by weight of the total monomers used for the polymerization.

In order to assure that the total amount of the 1,2-bonds and the 3,4-bonds in the isoprene polymer part in the block (b) comprising isoprene homopolymer or a copolymer of isoprene and butadiene are not less than 40% of the total isoprene bond unit, a Lewis base is used as a co-catalyst in the polymerization of isoprene or isoprene-butadiene mixture. Examples of the Lewis base include ethers such as dimethyl ether, diethyl ether and tetrahydrofuran, glycol ethers such as ethylene glycol dimethyl ether and diethylene glycol dimethyl ether, and amine type compounds such as triethylamine, N,N,N',N'-tetramethylethylenediamine (TMEDA), and N-methylmorpholine. The amount of these Lewis bases used is generally 0.1 to 1000 times that of the lithium (in mole) of the polymerizing catalyst.

A solvent is preferably used for facilitating the control of the polymerization. As the solvent, an organic solvent which is inactive for the polymerization catalyst is used. Particularly preferable examples include aliphatic, alicyclic and aromatic hydrocarbons having 6 to 12 carbon atoms. Examples of such solvents include hexane, heptane, cyclohexane, methylcyclohexane, and benzene.

The polymerization is carried out in a temperature range of from 60 to 80° C. and in a time range of from 0.5 to 50 hours in any polymerization method.

The obtained styrene type block copolymer is subjected to hydrogenation treatment (hereinafter also simply referred to as hydrogenation) by known methods. In a preferable method, the copolymer is dissolved in a solvent which is inactive to the hydrogenation reaction and the hydrogenation catalyst then allowed to react with the molecular hydrogen by a known hydrogenation catalyst. Examples of the catalyst to be used include a heterogeneous catalyst comprising a support such as carbon, alumina and diatomaceous earth carrying Raney Nickel, or a metal such as Pt, Pd, Ru, Rh, and Ni, or Ziegler type catalyst comprising a transition metal and an alkyl aluminum compound, alkyl lithium compound and the like. The reaction is carried out at a hydrogen pressure of from normal to 200 kg/cm$^2$, a reaction temperature of from normal to 250° C., and the reaction time of from 0.1 to 100 hours.

The styrene type block copolymer after the reaction is obtained by solidifying the reaction mixture with methanol and the like followed by heating or drying under a reduced pressure, or by removing the solvent azeotropically by pouring the reaction mixture into boiling water, followed by heating or drying under reduced pressure.

<Component (B): Specific thermoplastic elastomer>

As the specific thermoplastic elastomer to be used for the thermoplastic elastomer composition of the present invention, one or more compounds selected from the group consisting of polyester type thermoplastic elastomers, polyamide type thermoplastic elastomers, and polyurethane type thermoplastic elastomers are used.

(i) Polyester type thermoplastic elastomer

As a polyester type elastomer, those having a bending modulus according to JIS K-7203 of not more than 10,000 kg/cm$^2$, particularly preferably not more than 5,000 kg/cm$^2$, and/or having a melting point by DSC (peak temperature) of not more than 230° C., particularly preferably not more than 220° C. are preferable. Such elastomers can be obtained by polycondensation of an oligomer obtained by esterification or ester exchange reaction of (1) an aliphatic and/or alicyclic diol having 2–12 carbon atoms, (2) an aromatic dicarboxylic acid or an alkyl ester thereof, and (3) a polyalkylene ether glycol having the weight average molecular weight of 400 to 6,000.

As the aliphatic and/or alicyclic diol having 2–12 carbon atoms used according to the present invention, a material known as raw materials for polyesters, particularly those known as raw materials for polyester elastomers can be used. Examples of such compounds include ethylene glycol, propylene glycol, trimethylene glycol, 1,4-butanediol, 1,4-cyclohexane diol, 1,4-cyclohexane dimethanol and the like; a material mainly containing 1,4-butane diol or ethylene glycol is preferable, and particularly preferably used is a material mainly containing 1,4-butanediol. They can be used alone or in admixtures of two or more kinds.

As the aromatic dicarboxylic acid, those compounds known as a raw material for polyesters, particularly those for polyester elastomers can be used. Examples of such compounds include terephthalic acid, isophthalic acid, phthalic acid, 2,6-naphthalene dicarboxylic acid and the like. A material mainly containing terephthalic acid and 2,6-naphthalene dicarboxylic acid is preferable, but particularly preferable is a material mainly containing terephthalic acid, and they can be used in admixtures of two or more kinds. Examples of an alkyl ester of the aromatic dicarboxylic acid include dimethyl esters such as dimethyl terephthalate, dimethyl isophthalate, dimethyl phthalate, 2,6-dimethyl naphthalate and a preferable example includes dimethyl terephthalate, 2,6-dimethyl naphthalate, and a particularly preferable example is dimethyl terephthalate. These can be used in admixtures of two or more kinds. In addition to the above-mentioned compounds, a diol having three functional groups, and other diols or other dicarboxylic acids and an ester thereof can be copolymerized in a small amount, and an aliphatic or alicyclic dicarboxylic acid such as adipic acid, or an alkyl ester thereof can be used as a copolymerizing component.

As the polyalkylene ether glycol, those having a weight average molecular weight of 400 to 6,000 are used, but a preferable weight average molecular weight is 500 to 4,000, and particularly preferable weight average molecular weight is 600 to 3,000. When the molecular weight is below 400, the resulting copolymer shows inferior block polymerization, and when the weight average molecular weight exceeds 6,000, the physical properties of the resulting polymer are degraded due to the phase separation in the system. Examples of the polyalkylene ether glycol include polyethylene glycol, poly(1,2 and 1,3 propylene ether) glycol, polytetramethylene ether glycol, polyhexamethylene ether glycol, a block or random copolymer of ethylene oxide and propylene oxide, a block or random copolymer of ethylene oxide and tetrahydrofuran, and the like. A particularly preferable example is polytetramethylene ether glycol.

The content of the polyalkylene ether glycol is desirably 5 to 95% by weight, preferably 10 to 85% by weight, particularly preferably 20 to 80% by weight of the resulting block copolymer. When the content is more than 95% by weight, it becomes difficult to give a polymer by condensation polymerization.

The polyester type copolymer according to the present invention can be (4) a polyester oligomer in which an aliphatic or alicyclic dicarboxylic acid and an aliphatic diol are condensed or (5) a polyester oligomer synthesized from an aliphatic lactone or an aliphatic monool carboxylic acid instead of (3) a polyalkylene ether glycol having a weight average molecular weight of 400 to 6,000.

An example of (4) includes a polyester oligomer having such a structure that one or more kinds of an alicyclic dicarboxylic acid such as 1,4-cyclohexane dicarboxylic acid, 1,2-cyclohexane dicarboxylic acid, dicyclohexyl-4,4'-dicarboxylic acid or an aliphatic dicarboxylic acid such as succinic acid, oxalic acid, adipic acid, and sebacic acid, is condensed with one or more kinds of diols such as ethylene glycol, propylene glycol, tetramethylene glycol, and pentamethylene glycol, and an example of (5) includes a polycaprolactone type polyester oligomer synthesized from ε-caprolactone and ω-oxycaproic acid and the like.

The esterification, ester exchange reaction, and polycondensation reaction of the present invention can be carried out according to ordinary methods. As a catalyst for these reactions, one or more known catalysts such as an alcoholate, chloride or oxide of tin, titanium, zinc, or manganese can be used respectively, however, an organic titanium type catalyst, particularly tetrabutyl titanate is desirable. As an assistant agents phosphoric acid, phosphorous acid, hypophosphorous acid, or a metal salt thereof can be added as well. Particularly, addition of an alkali metal salt of hypophosphorous acid is preferable since the content of the terminal carboxyl group is decreased to improve the resistance to hydrolysis.

Examples of the alkali metal salt of the hypophosphorous acid include sodium hypophosphite, potassium hypophosphite, and lithium hypophosphite, and particularly desirable is sodium hypophosphite.

The amount of the alkali metal hypophosphite added is 1 to 1,000 ppm, preferably 3 to 200 ppm, more preferably 5 to 80 ppm to the resulting polymer. An amount of less than 1 ppm is not preferable since the effect of the addition cannot be fully obtained, and an amount of more than 1,000 ppm is not preferable either since the effect is not increased, but rather the polycondensation reaction is inhibited.

As for a method of addition, the alkali metal hypophosphite can be added to molten polymer in the form of a solution, slurry, or solid, and the timing of the addition is at least before the completion of the polycondensation reaction, that is, it can be added any time between before the esterification reaction or ester exchange reaction and before the completion of the polycondensation reaction. It is particularly preferable to add it in the form of a slurry just before the polycondensation under reduced pressure is started, since it causes less degradation of the polymerization property.

In the reaction step, another additive may also be present. For example, a hindered phenol type antioxidant, hindered amine type antioxidant, phosphorus type antioxidant, sulphur type antioxidant, triazole type light stabilizer, and other known additives can be used. According to the present invention, it is particularly preferable to add a hindered phenol type antioxidant in an amount of 0.01 to 1% by weight to the polymer, from the view point of the resulting effects. Esterification or ester exchange reaction is carried out normally at 120 to 250° C., preferably 150 to 230° C., and the melt polycondensation reaction is carried out under reduced pressure of usually not more than 10 torr, at 200 to 280° C. for 2 to 6 hours.

Usually, the polymer obtained by melt polymerization is kept at a temperature not less than the melting point and sequentially discharged from the reaction vessel and pelletized. The obtained pellets can be subjected to solid phase polymerization if necessary.

The bending modulus of such polyester type elastomer according to JIS K-7203 is preferably not more than 10,000 kg/cm$^2$, particularly preferably not more than 5,000 kg/cm$^2$. The melting point (peak temperature) of the polyester elastomer obtained according to DSC (Differential Scanning Calorimetry) is preferably not more than 230° C., particularly preferably not more than 220° C.

Such polyester type elastomers include commercially available polymers "PELPRENE P" or "PELPRENE S" (commercial names, available from Toyobo Co., Ltd.) or "HYTREL" (commercial name, available from Toray-Du Pont Industries, Inc.), "LOMOD" (commercial name, available from Nippon G.E. Plastic Co., Ltd.), "FLECMER" (commercial name, available from The Nippon Synthetic Chemical Industry, Co., Ltd.), "Teijin Polyester Elastomer" (commercial name, available from Teijin Ltd.) and the like.

(ii) Polyamide type thermoplastic elastomer

The polyamide type thermoplastic elastomer contains a polyamide (Nylon 6, Nylon 66, Nylon 11, Nylon 12 and the like) as a hard segment and a polyether or polyester as a soft segment. For example, the polyether block amide can be represented by the following general formula (I);

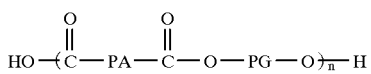

(wherein PA represents the block of a polyamide constituting a hard segment, and PG represents the block of a polyether constituting a soft segment.)

The polyether block amide which is used in the present invention and which can be represented by the above-mentioned general formula (I) itself is a known substance as it is disclosed in the specification of U.S. Pat. No. 3,044,978 and the like.

This substance can be prepared by polycondensation of the components (i) a diamine and a dicarboxylate, lactames or an amino dicarboxylic acid (PA component), (ii) a polyoxyalkylene glycol such as polyoxyethylene glycol, polyoxy propylene glycol (PG component) and (iii) a dicarboxylic acid.

The commercially available products include "PEBAX" (commercial name, available from Toray Industries, Inc.), "DAIAMID-PAE" (commercial name, available from Daicel-Hüls Co., Ltd.), "UBE Polyamide Elastomer" (commercial name, available from Ube Industries, Ltd.), "NOVAMID PAE" (commercial name, available from Mitsubishi Chemical Corp.), "GRILUX A" (commercial name, available from Dainippon Ink and Chemicals, Inc.), "GRILON ELX, ELY" (commercial name, available from MS Japan Co., Ltd.) and the like.

(iii) Polyurethane type thermoplastic elastomer

The polyurethane type thermoplastic elastomer contains a hard segment comprising a diisocyanate and a short chain glycol (ethylene glycol, propylene glycol, 1,4-butanediol, bisphenol A and the like), and a soft segment comprising a diisocyanate and a long chain polyol. The long-chain polyol includes those of a polyether type such as poly(alkylene oxide)glycol having a molecular weight of 400 to 6,000 (for example, polyethylene glycol, poly(1,2 and 1,3 propylene oxide) glycol, poly (tetramethylene oxide) glycol, poly (hexamethylene oxide)glycol and the like), or those of polyester type such as polyalkylene adipate, polycaprolactone, and polycarbonate. Such polyurethane type thermoplastic elastomer is a compound having the structure represented by the following general formula (II).

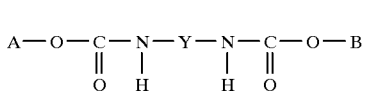

(wherein A represents a hard segment comprising a diisocyanate and a short-chain glycol, B represents a soft segment comprising a diisocyanate and a long-chain polyol, Y represents the residual group of the diisocyanate compound of the urethane bond linking the A segment and B segment.)

As the diisocyanate compound, a known and normally used compound such as phenylene diisocyanate, tolylene diisocyanate, xylene diisocyanate, 4,4'diphenylmethane diisocyanate, hexamethylene diisocyanate and the like can be used.

Examples of the commercially available polyurethane type thermoplastic elastomer include "ELASTOLLAN" (commercial name, available from Takeda Badische Urethane Ind.), "MIRACTRAN" (commercial name, available from Nippon Miractran Co., Ltd), "LEZAMIN" (commercial name, available from Dainichiseika Colour & Chemicals Mfg. Co., Ltd.) and "Y-Fine P" (commercial name, available from Asahi Glass Co., Ltd.) and the like.

Among those thermoplastic elastomers, a polyester type thermoplastic elastomer is preferable due to its good compatibility with the component (A).

(2) Additional compounding materials

In addition to the basic components (A) and (B), any of compounding components can be added to the thermoplastic elastomer of the present invention for various purposes.

Illustratively, additives such as antioxidants, thermal stabilizers, light stabilizers, UV absorbers, neutralizing agents, lubricants, anti-fogging agents, antiblocking agents, slipping agents, crosslinking agents, crosslinking assistants, coloring agents, flame-retardants, dispersing agents, antistatic agents can be added. Among these, it is particularly important to add an antioxidant, and one or more antioxidants selected from phenol types, phosphite types and thioether types can be used.

It is also possible to blend an additional compounding material including other thermoplastic resins except for the above-mentioned components (A) and (B), or various elastomers, various plasticizers, and various fillers and the like in a range that does not notably mar the effect of the present invention.

Examples of thermoplastic resins as the additional compounding component include olefin type resins such as a propylene type resin, ethylene type resin, and polybutene-1 resin, styrene type resins such as polystyrene, acrylonitrile-styrene copolymer, and acrylonitrile-butadiene-styrene copolymer, polyamide type resins such as a polyphenylene ether type resin, Nylon 6, and Nylon 66, polyester type resins such as polyethylene terephthalate and polybutylene terephthalate, polyoxy methylene type resins such as polyoxymethylene homopolymer and polyoxymethylene copolymer, and polymethyl methacrylate type resins etc.

The above-mentioned propylene type resins are propylene homopolymers and copolymers wherein the main component is propylene, and illustrative examples include propylene/ethylene random copolymers, propylene/ethylene block copolymers and the like.

Examples of the above-mentioned ethylene type resins include polyethylene resins, ethylene/α-olefin copolymers, ethylene/vinyl acetate copolymers, ethylene(meth)acrylic acid copolymers, ethylene (meth)acrylic ester copolymers and the like.

As the above-mentioned polyethylene resin, a low density polyethylene resin produced by high-pressure process according to an ordinary method, or a copolymer of ethylene and olefin having crystallinity as measured by X ray diffraction method of 30 to 95%, which is obtained by a medium- or low-pressure process can be used.

Examples of the straight-chain α-olefin, which is the above-mentioned comonomer, include butene-1, pentene-1, hexene-1, 4-methylpentene-1, octene-1 and the like. These can be used in admixtures of two or more kinds.

The thermoplastic resin can be used alone, or in admixtures of two or more kinds.

Examples of the various elastomers include ethylene type elastomers such as ethylene/propylene binary copolymer (EPM), ethylene/propylene/nonconjugate diene ternary copolymer rubber (EPDM), ethylene/butene-1 binary copolymer rubber (EBM), ethylene/propylene/butene-1 ternary copolymer rubber, ethylene/hexene copolymer, ethylene/octene copolymer which is a polymer having non-crystallinity or low crystallinity of below 30%. The elastomer can be used alone or in admixtures of two or more kinds.

In order to further increase the compatibility between the components (A) and (B) used for the thermoplastic elastomer layer, and to increase the bonding strength with the olefin type resin or the nonolefin type resin, a compatibilizer such as a maleated polyolefin including maleated polypropylene, and maleated polyethylene, or maleated SEBS, maleated SEPS, and a hydrogenated product of maleated styrene/conjugate diene block copolymer such as maleated hydrogenated styrene/butadiene/isoprene/styrene copolymer can be compounded as well.

Examples of the above-mentioned inorganic filler include talc, calcium carbonate, mica, glass fiber, glass balloon, carbon fiber and the like.

Examples of the plasticizer used as an additional component according to the present invention include a softening agent for a hydrocarbon type rubber having a weight average molecular weight of 300 to 3,000 and polybutene.

The softening agent for the hydrocarbon type rubber is generally a mixture of an aromatic ring, naphthene ring and paraffin ring, and those in which the carbon number in the paraffin chain shares 50% or more of the total carbon are called paraffin type oils, those in which the carbon in the naphthene ring shares 30 to 45% are called naphthene type oil and those having aromatic carbons in an amount of more than 30% are called aromatic type oils. Among these, a paraffin type oil is preferably used from the view point of weather resistance.

(3) Compounding ratio

The compounding ratio of each component constituting the thermoplastic elastomer of the composite molded product according to the present invention is that Component (A) is 5 to 95% by weight, preferably 10 to 90% by weight, particularly preferably 20 to 80% by weight of the total of component (A) and component (B).

When the compounding ratio of the component (A) is below 5% by weight, the heat fusion property of the resulting thermoplastic elastomer layer to the olefin type resin layer becomes inferior, and when it exceeds 95% by weight, the fusion bonding property to the nonolefin type resin layer becomes inferior.

The amount of the component (B) is 95 to 5% by weight, preferably 90 to 10% by weight, particularly preferably 80 to 20% by weight of the total of component (A) and component (B).

When the compounding ratio of the component (B) exceeds 95% by weight, the heat fusion property of the thermoplastic elastomer layer to the olefin type resin layer becomes inferior, while an amount of below 5% by weight results in an inferior heat fusion property to the nonolefin type resin layer.

[II] Composite molded product

In the composite molded product according to the present invention, a thermoplastic elastomer layer and a thermoplastic resin (crystalline olefin type resin or nonolefin type resin) layer are bonded by means of fusion bonding.

The layer structure includes a two layer structure comprising a thermoplastic elastomer layer and a thermoplastic resin layer, a three layer structure comprising a thermoplastic resin layer/a thermoplastic elastomer layer/a thermoplastic resin layer, having the thermoplastic elastomer as the intermediate layer, and a multilayer structure wherein these structures are combined.

(1) Thermoplastic elastomer layer (II)

This contains the above-described thermoplastic elastomer composition of the present invention as the base material.

(2) Thermoplastic resin layer (I)

The thermoplastic resin used for the other layer of the composite molded product of the present invention (hereinafter also referred to simply as "resin layer") includes a crystalline olefin type resin and a nonolefin type resin.

(i) Crystalline olefin type resin

The crystalline olefin type resin is one or more resins selected from the group consisting of a propylene type resin, ethylene type resin, crystalline butene-1- resin. Preferably it is a propylene type resin having a bending modulus according to JIS-K7203 of 2,000 to 60,000 kg/cm$^2$, preferably 3,000 to 60,000 kg/cm$^2$, particularly preferably 4,000 to 60,000 kg/cm$^2$.

(a) Propylene type resin

The above-mentioned propylene type resin includes propylene homopolymers, copolymer resins containing propylene as a main component, such as propylene/ethylene random copolymers and propylene/ethylene block copolymers. The polypropylene resin has a melt flow rate (JIS-K6758, 230° C., 2.16 kg load) of 0.01 to 100 g/10 min, preferably 0.05 to 80 g/10 min, particularly preferably 0.1 to 60 g/10 min. In the preferable propylene/ethylene random copolymer or propylene/ethylene block copolymer, the ethylene content is 0.01 to 15% by weight, preferably 0.1 to 13% by weight, particularly preferably 1 to 10% by weight. The ethylene content referred to here is a value measured by IR spectral analysis and the like.

(b) Ethylene type resin

The above-mentioned ethylene type resin is a polyethylene resin having a melt flow rate (190° C., 2.16 kg load) of 0.01 to 100 g/10 min, preferably 0.01 to 50 g/10 min, which is produced by an ordinary method.

Such polyethylene resin includes a low density polyethylene resin (branched polyethylene resin) produced by high-pressure process, an ethylene homopolymer produced by medium- or low-pressure process, or a low density, medium density and high density polyethylene resin (straight-chain polyethylene resin) which is a copolymer of ethylene and olefin.

Examples of the α-olefin, which is the above-mentioned comonomer, include butene-1, pentene-1, hexene-1,4-methylpentene-1, octene-1 and the like, and these can be used in admixture of two or more kinds.

As illustrative production conditions, generally a copolymerization of ethylene and α-olefin is carried out using a Ziegler type catalyst, vanadium type catalyst, Kaminsky type (metallocene type) catalyst and the like, at a pressure of 5 to 2,500 kg/cm$^2$, and temperature of 50 to 300° C. For example a method described in Japanese Patent Publication No. 56-18132 and the like is known.

Among these, particularly preferable resins are a straight-chain polyethylene resin obtained by a medium- or low-pressure process.

(c) Crystalline butene-1 resin

As the above-mentioned crystalline butene-1 resin, a crystalline resin synthesized from butene-1 monomer which may contain a small amount (not more than 20% by weight) of another comonomer such as ethylene and propylene, having a density of 0.890 to 0.925 g/cm$^3$, preferably 0.893 to 0.923 g/cm$^3$, particularly preferably 0.900 to 0.920 g/cm$^3$, a melt flow rate (at 190° C., 2.16 kg load) of 0.01 to 1,000 g/10 min, preferably 0.05 to 500 g/10 min, particularly preferably 0.1 to 100 g/10 min, a weight average molecular weight of 100,000 to 3,000,000, preferably 50,000 to 2,500,000 is preferably used.

(ii) Nonolefin type resin

A nonolefin type resin is one or more resins selected from the group consisting of a nonolefin type resin such as an aromatic polycarbonate, an acrylic type resin, a styrene type resin, polyvinyl chloride, and a modified polyphenylene ether, and preferable examples include an aromatic polycarbonate, acrylic type resin, styrene type resin, having a bending modulus according to JIS-K7203 of not less than 15,000 kg/cm$^2$, preferably 18,000 to 60,000 kg/cm$^2$.

(a) Aromatic polycarbonate

The above-mentioned aromatic polycarbonate is produced by carrying out a reaction between an aromatic hydroxy compound, optionally together with a small amount of a polyhydroxy compound, and phosgene. The aromatic dihydroxy compound optionally with a small amount of polyhydroxy compound can also be subjected to ester exchange reaction with a diester carbonate to produce the aromatic polycarbonate. If necessary, a trifunctional compound or a compound having higher functionality, as a branching agent, or a molecular weight controlling agent are supplied to the reaction. The aromatic polycarbonate resin is a branched or unbranched thermoplastic aromatic polycarbonate resin.

Examples of the aromatic dihydroxy compound include 2,2-bis(4-hydroxyphenyl)propane (hereinafter also simply referred to as "bisphenol A"), tetrametyl bisphenol A, tetrabromobisphenol A, bis(4-hydroxyphenyl)-p-isopropylbenzene, hydroquinone, resocinol, 4,4'-dihydroxyphenyl, bis(4-hydroxyphenyl)methane, bis(4-hydroxyphenyl)ether, bis(4-hydroxyphenyl)sulphone, bis(4-hydroxyphenyl)sulphoxide, bis(4-hydroxyphenyl)sulphide, bis(4-hydroxyphenyl)ketone, 1,1-bis(4-hydroxyphenyl)ethane, 1,1-bis(4-hyroxyphenyl)cyclohexane and the like with bisphenol A particularly preferable.

In order to obtain a branched aromatic polycarbonate resin, a polyhydroxy compound represented by phloroglucine, 4,6dimethyl-2,4,6-tri(4-hydroxyphenyl)heptene-2,4,6-dimeth yl-2,4,6-tri(4-hydroxyphenyl)heptane, 2,6-dimethyl-2,4,6-tri(4-hydroxyphenyl)heptene-3,2,6-dimeth yl-2,4,6-tri(4-hydroxyphenyl)heptane, 1,3,5-tri(4-hydroxyphenyl)benzene, 1,1,1-tri(4-hydroxyphenyl)ethane and the like, and 3,3-bis(4-hydroxyaryl)oxyindole [=isatin (bisphenol A)], 5-chloroisatin, 5,7-dichloroisatin, 5-bromoisatin and the like is used to replace a part (for example 0.1 to 2 mol %) of the above-mentioned dihydroxy compound.

The monovalent aromatic hydroxy compound which is suitable for controlling the molecular weight includes m- and p-methyl phenol, m- and p-propyl phenol, p-bromo phenol, p-tertbutylphenol and p-long chain alkyl substituted phenol and the like. Preferable aromatic polycarbonate resins include bis(4-hydroxyphenyl)alkane type compounds, and particularly preferable is a polycarbonate whose main raw material is bisphenol A. A polycarbonate copolymer obtained from two or more kinds of aromatic dihydroxy compounds, a branched polycarbonate resin obtained by using a small amount of tri-valent phenol type compound are preferable examples as well (Japanese Patent Laid-open Nos. 63-30524 and 56-55328, Japanese Patent Publication Nos. 55-414, 60-25049 and 3-49930). The aromatic polycarbonate resin can be used in admixtures of two or more kinds.

The weight average molecular weight of a preferable polycarbonate resin measured by GPC and converted to polystyrene basis is in the range of from 10,000 to 150,000, preferably from 15,000 to 100,000, and most preferably from 350,000 to 80,000, from the view point of well balanced heat resistance, mechanical strength and molding processability and the like.

Commercially available examples include "IUPILON" (commercial name, available from Mitsubishi Engineering Plastics Co., Ltd.), and "NOVAREX" (commercial name, available from Mitsubishi Engineering Plastics Co., Ltd.) and the like.

(b) Acrylic type resin

The acrylic type resin is a resin obtained by polymerization of acrylic acid and a derivative thereof, illustrative examples include polymers and copolymers of acrylic acid, acrylic ester, acrylamide, acrylonitrile, methacrylic acid, methacrylic ester and the like. Preferable examples are a polymer of methacrylic ester such as methyl methacrylate and ethyl methacrylate and particularly preferable is a polymer of methyl methacrylate (polymethyl methacrylate resin). Commercially available products include "ACRYPET" (commercial name, available from Mitsubishi Rayon Co., Ltd.) and the like.

(c) Styrene type resin

The above-mentioned styrene type resin includes polystyrene made of styrene homopolymer (GP polystyrene ; commercially available from Mitsubishi Chemical Co., Ltd. under the commercial name of "DIAREX" and the like), high impact polystyrene (commercially available from Mitsubishi Chemical Corp. under the commercial name of "DIAREX" and the like), ABS resin (acrylonitrile/butadiene/styrene resin) (commercially available from Mitsubishi Chemical Corp. under the commercial name of "TUFREX" and the like), AS resin (acrylonitrile/styrene resin), (commercially available from Mitsubishi Chemical Corp. under the commercial name of "SANREX" and the like.)

The ABS resin is produced by emulsion polymerization, mass-suspension polymerization or mass polymerization, has a composition comprising 10 to 30% by weight of acrylonitrile, 5 to 45% by weight of butadiene, and 50 to 85% by weight of styrene and includes a polymer wherein a-methyl styrene is used instead of styrene.

(d) Polyvinyl chloride

The above-mentioned polyvinyl chloride is a compound resin whose basic component is a polymer obtained by polymerization of vinyl chloride and preferably it is a rigid PVC compound resin. Commercially available products include "VINIKA COMPOUND" (commercial name, available from Mitsubishi Chemical MKV Co., Ltd.) and the like.

(e) Modified polyphenylene ether

The above-mentioned modified polyphenylene ether is an alloy of a polyphenylene ether which is an amorphous highly heat resistant resin and a crystalline highly heat resistant resin including a polyamide resin, polyester resin such as polybutylene terephthalate, propylene type resin, and shock resisting polystyrene and the like. Commercially available products include "IUPIACE" (commercial name, available from Mitsubishi Chemical Engineering Plastics Co., Ltd.), "LEMALLOY" (commercial name, available from Mitsubishi Chemical Co., Ltd.) and the like.

Polyphenylene ether alone, which is not alloyed with the crystalline highly heat resistant resin, is not practical since the molding can be done only at a high temperature and the molding processability is inferior.

(iii) Additional compounding agent

These resins can be compounded with various other additives including fillers such as rubber components, talc, calcium carbonate, mica and glass fiber, plasticizers such as paraffin oil, antioxidants, heat stabilizers, light stabilizers, UV absorbing agents, neutralizing agents, slip additives, compatibilizers, lubricants, anti-fogging agents, anti-blocking agents, slipping agents, dispersing agents, coloring agents, antibacterial agents, and fluorescent whiteners.

[III] Production of a composite molded body

Examples of a method of producing such a composite molded body include various molding methods such as extrusion lamination molding method, co-extrusion molding method, blow molding method, insert injection molding method, double injection molding method, core back injection molding method, sandwich injection molding method, and injection press molding method.

Among the above-mentioned molding methods, insert injection molding method is a process in which a core material (a resin for a resin layer) is molded by injection molding, extrusion molding, sheet molding, or a film molding process and the molded product is inserted into a die then a surface material (a thermoplastic elastomer) is injected into the gap between the molded product and the dies and molded, or a surface material (a thermoplastic elastomer) is previously molded by injection molding, extrusion molding, sheet molding or film molding, and the molded product is inserted into a die and a core material (a resin for a resin layer) is injected into the gap between the molded product and the dies and molded.

The double injection molding method is a molding process in which a core material (a resin for a resin layer) is subjected to injection molding using two or more injection molding machines and the dies are rotated or transferred so that the cavity of the dies is replaced to provide a gap between the molded product and the dies, and a surface material (a thermoplastic elastomer) is injected thereinto and molded.

The core back injection molding method is a process in which a core material (a resin for a resin layer) is molded using one injection molding machine and one die, then the cavity capacity of the die is increased and a surface material (a thermoplastic elastomer) is injected into the gap between the molded product and the die and molded.

The molding of the core material can be carried out by an ordinary injection molding method or by gas injection molding method.

As the injection molding conditions for the core material, a molding temperature of generally 100 to 300° C., preferably 150 to 280° C. is employed and an injection pressure of 50 to 1,000 kg/cm$^2$, preferably 100 to 800 kg/cm$^2$ is employed.

Further, it is important that the average thickness of the core material layer of the injection molded product be 0.5 to 6 mm, and those exceeding the above range cause shrink marks on the core material layer and the surface of the molded product shows inferior smoothness. Also those below the range may not be able to satisfy the mechanical properties such as rigidity, and strength, heat resistance and durability that are required for automobile interior parts.

It is important that the average thickness of the surface material layer be 1 to 5 mm, those exceeding the above range providing poor soft-feeling, while those below the range provide poor adhesive force between the core material and the surface material.

As the injection molding conditions for the surface material layer, a molding temperature of generally 150 to 300° C., preferably 200 to 290° C., and particularly preferably 220 to 280° C., an injection pressure of 50 to 1,000 kg/cm$^2$ and preferably 100 to 800 kg/cm$^2$ are employed.

Runners or spools comprising only the surface material can be recycled for the surface material, and runners or spools comprising only the core material or a core material and the surface material can be recycled for the core material and defective molded products and the like can be recycled for the core material as well.

[IV] Uses

The composite molded product comprising the thermoplastic elastomer layer and the resin layer thus obtained can be used for various industrial parts.

Illustratively, they can be used for automobile interior parts such as instrument panels, center panels, center console boxs, door trim, pillars, assist grips, steering wheel, air bag covers, and automobile exterior parts such as molling, automobile functional parts such as rack and pinion boots, suspension covers, CVJ boots, electric appliance parts such as vacuum cleaner bumpers, remote control switches, and various key top and the like for OA devices, products for underwater use such as water goggles, underwater covers for cameras, and various covering parts, and industrial parts having various packing for imparting hermetic, water proofing, sound proofing, and damping properties and the like, and electric, electronic parts such as curl cord wire coating, belts, hoses, tubes and sound deadening gear, sports goods and the like.

EXAMPLES

The present invention will be further described by the following examples.

[I] Evaluation method

Various evaluations were carried out in these examples and comparative examples according to the following testing methods.

For producing the test sample, a core material layer (a thermoplastic resin layer) was first molded using a double injection molding machine (KS-2C-680 manufactured by Takahashi Seiki Kogyojo K.K.). Then a surface material layer (a thermoplastic elastomer layer) was molded at 240° C. to give a composite injection molded product of 300 mm×300 mm×4 mm (both the core material layer and the surface material layers having a thickness of 2 mm).

(1) JIS Shore hardness: A scale [–] Based on JIS-K6301

(2) Heat fusion property (peel strength)

A strip specimen cut out from the above-mentioned composite injection molded product having a width of 25 mm, a length of 100 mm, a thickness of 4 mm (both the core material layer and the surface material layer had a thickness of 2 mm) was used and the surface material layer and the core material layer were pulled in the opposite directions at a rate of 200 mm/min and the peel strength of the bonded interface between the surface material layer and the core material layer was measured.

[II] Raw materials (1) Thermoplastic elastomer layer [surface material], Tables 1 and 2.

TABLE 1

Component (A)

| Block Copolymer | Amount (%) of 1,2-bond and 3,4-bond in isoprene polymer segment | Weight average molecular weight | Styrene content (wt %) | Hardness (JIS-A) |
|---|---|---|---|---|
| A-1*[1] | 55 | 99,000 | 20 | 57 |
| A-2*[2] | 70 | 85,000 | 20 | 68 |
| A-3*[3] | 55 | 99,000 | 20 | 52 |
| A-4*[4] | 8 | 73,000 | 30 | 80 |
| A-5*[5] | — | 86,000 | 29 | 75 |

*[1]Styrene/isoprene/styrene block copolymer ("HYBRAR-VS-3" produced by Kuraray Co., LTD.)
*[2]Styrene/isoprene/styrene block copolymer ("HYBRAR-VS-1" produced by Kuraray Co., LTD.)
*[3]Hydrogenated product of A-1 ("HYBRAR-HVS-3" produced by Kuraray Co., LTD.)
*[4]Hydrogenated product of styrene/isoprene/styrene block copolymer ("SEPTON2007P" produced by Kuraray Co., LTD.)
*[5]Hydrogenated product of styrene/butadiene/styrene block copolymer ("KRATON G1652" produced by Shell Chemical Co.)

TABLE 2

Component (B)

| Thermoplastic elastomer | Type | Producer Trade name | Grade name | Hardness (JIS-A) | Modulus in flexure kg/cm$^2$ | Melting point (peak temp.) °C. |
|---|---|---|---|---|---|---|
| B-1 | Polyester | Toyobo Co. "PELPRENE" | P30B | 71 | 150 | 160 |
| B-2 | Polyester | Toyobo Co. "PELPRENE" | P90B | 96 | 1650 | 203 |
| B-3 | Polyamide | Toray Industries "PEBAX" | 2533SAOO | 75 | — | — |
| B-4 | Polyurethane | Takeda-Badische Urethane Ind. "ELASTOLLAN" | ET-265R | 65 | — | — |
| B-5 | Styrene | Mitsubishi Chemical Corp. "RABALON" | MJ7300C | 75 | — | — |
| B-6 | Olefin | Mitsubishi Chemical Corp. "THERMORUN" | T3551B | 55 | — | — |

(2) Thermoplastic resin layer [core material]
PP (crystalline polypropylene resin): "Mitsubishi Polypro BC03B" available from Mitsubishi Chemical Corp.(bending modulus of 12,000 kg/cm$^2$)
PC (polycarbonate resin): "NOVAREX 7027A" available from Mitsubishi Chemical Corp. (bending modulus of 22,500 kg/cm$^2$)
ABS (acrylonitrile/butadiene/styrene resin):"TUFREX TFX-410" available from Mitsubishi Chemical Corp. (bending modulus of 26,000 kg/cm$^2$)
PMMA (polymethylmethacrylate resin): "ACRYPET IR H-70" available from Mitsubishi Rayon Co., Ltd. (bending modulus of 13,000 kg/cm$^2$)

[III] Examples and Comparative Examples
Examples 1 to 10 and Comparative examples 1 to 8

The components were compounded according to the compositions (parts by weight) shown in Tables 3 to 4 and a phenol type antioxidant (available from Ciba-Geigy Co., Ltd., under the commercial name of "IRGANOX 1010") was further added therewith in an amount of 0.2 parts by weight to 100 parts by weight of the total amount of the composition, then melt kneading was carried out at a set temperature of 240° C. by a double-screw extruder having a cylinder diameter of 45 mm, a compression ratio L/D=33, to obtain an extruded product in the form of a strand, which was then cut into pellets. The obtained TPE composition pellets were made into a sheet by injection molding as described above and the sheet was subjected to the above-mentioned evaluations. The results of these evaluations are shown in Tables 3 and 4.

TABLE 3

| | Example | | | | | | | | | |
|---|---|---|---|---|---|---|---|---|---|---|
| | 1 | 2 | 3 | 4 | 5 | 6 | 7 | 8 | 9 | 10 |

Material of surface layer:
Composition (part by weight):

Component (A)

| | | | | | | | | | | |
|---|---|---|---|---|---|---|---|---|---|---|
| A-1 | 50 | — | — | — | — | — | — | — | — | — |
| A-2 | — | 50 | — | — | — | — | — | — | — | — |
| A-3 | — | — | 50 | 50 | 50 | 50 | 70 | 30 | 25 | 25 |

TABLE 3-continued

|  | Example | | | | | | | | | |
|---|---|---|---|---|---|---|---|---|---|---|
|  | 1 | 2 | 3 | 4 | 5 | 6 | 7 | 8 | 9 | 10 |
| Component (B) | | | | | | | | | | |
| B-1 | 50 | 50 | 50 | — | — | — | 30 | 70 | 50 | 50 |
| B-2 | — | — | — | 50 | — | — | — | — | — | — |
| B-3 | — | — | — | — | 50 | — | — | — | — | — |
| B-4 | — | — | — | — | — | 50 | — | — | — | — |
| B-5 | — | — | — | — | — | — | — | — | 25 | — |
| B-6 | — | — | — | — | — | — | — | — | — | 25 |
| Properties: | | | | | | | | | | |
| Hardness (JIS-A) | 68 | 67 | 68 | 89 | 69 | 65 | 69 | 74 | 75 | 65 |
| Bending modulus (kg/cm$^2$) | 100 | 100 | 100 | 500 | 120 | — | 120 | 140 | 150 | — |
| Evaluation: Heating fusing property (Peeling strength: kg/25 mm) Core material | | | | | | | | | | |
| PP | 4.1 | 4.0 | 4.4 | 6.6 | 3.7 | 3.5 | 4.5 | 2.2 | 1.1 | 1.9 |
| PC | 6.6 | 6.4 | 7.1 | 10.7 | 6.4 | 5.7 | 1.3 | 18.9 | 8.8 | 8.3 |
| ABS | 6.0 | 5.9 | 6.5 | 9.8 | 6.4 | 5.2 | 1.3 | 6.8 | 6.8 | 8.9 |
| PMMA | 8.0 | 7.9 | 8.8 | 13.2 | 2.1 | 7.0 | 1.4 | 8.5 | 7.9 | 9.0 |

TABLE 4

|  | Comparative Example | | | | | | | |
|---|---|---|---|---|---|---|---|---|
|  | 1 | 2 | 3 | 4 | 5 | 6 | 7 | 8 |
| Material of surface layer: Composition (part by weight): | | | | | | | | |
| Component (A) | | | | | | | | |
| A-1 | — | — | — | — | — | — | — | — |
| A-2 | — | — | — | — | — | — | — | — |
| A-3 | 100 | — | — | — | 50 | 50 | — | — |
| A-4 | — | — | — | — | — | — | 50 | — |
| A-5 | — | — | — | — | — | — | — | 50 |
| Component (B) | | | | | | | | |
| B-1 | — | 100 | — | — | — | — | 50 | 50 |
| B-2 | — | — | — | — | — | — | — | — |
| B-3 | — | — | — | — | — | — | — | — |
| B-4 | — | — | — | — | — | — | — | — |
| B-5 | — | — | 100 | — | 50 | — | — | — |
| B-6 | — | — | — | 100 | — | 50 | — | — |
| Properties: | | | | | | | | |
| Hardness (JIS-A) | 52 | 71 | 75 | 55 | 62 | 45 | 80 | 77 |
| Bending modulus (kg/cm$^2$) | — | 150 | 150 | — | — | — | 290 | 250 |
| Evaluation: Heat fusing property (Peeling strength: kg/25 mm) Core material | | | | | | | | |
| PP | 4.7 | X | 6.4 | 5.8 | 5.9 | 5.3 | X | X |
| PC | X | 20.0 | X | X | X | X | 3.2 | 6.0 |
| ABS | X | 7.4 | X | X | X | X | 2.6 | 4.2 |
| PMMA | X | 9.4 | X | X | X | X | 4.0 | 7.4 |

Note
X: <0.1 kg/25 mm, Range of no practical use

EXAMPLE 11

A crystalline polyolefin type resin (crystalline polypropylene resin) available from Mitsubishi Chemical Corp. under the commercial name of "MITSUBISHI POLYPRO BC03B" (bending modulus of 12,000 kg/cm$^2$) and a non-polyolefin type resin (polycarbonate resin), available from Mitsubishi Chemical Corp. under the commercial name of "NOVAREX 7027A" (bending modulus of 22,500 kg/cm$^2$) were subjected to injection molding by an inline screw type injection molding machine (IS90B, a small type injection molding machine manufactured by Toshiba Machine Co., Ltd.,) and a sheet of 120 mm×120 mm×2 mm was obtained, then it was cut to a size of 120 mm×60 mm×2 mm and these two sheets were juxtaposed as shown in FIG. 1, and inserted into a mold for a sheet of 120 mm×120 mm×4 mm. Then the thermoplastic elastomer composition of Example 4 was injected into the gap between the molded sheets and the mold using an inline screw type injection molding machine (IS90B, a small type injection molding machine manufactured by Toshiba Machine Co., Ltd.,) at an injection pressure of 500 kg/cm$^2$, injection temperature of 240° C., and mold temperature of 40° C., to give a composite injection molded product wherein the thermoplastic elastomer composition part had a size of 120 mm×120 mm×2 mm.

The merits of the thermoplastic elastomer composition according to the present invention and the composite molded product having such elastomer composition as one of the layers are that they show excellent fusion bonding properties and high peeling strength to wards both crystalline polyolefin type and nonpolyolefin type thermoplastic resins.

In particular, when one or more resins selected from polycarbonate and an acrylic type resin are used as the thermoplastic resin layer, the thermoplastic elastomer comprising a styrene type block copolymer as component (A) and a polyester type thermoplastic elastomer selected as component (B) shows particularly high heat fusion properties towards the thermoplastic resin layer.

What is claimed is:

1. A thermoplastic elastomer composition, comprising the following components (A) and (B);

component (A) 5 to 95% by weight of a hydrogenated product of a block copolymer comprising block (a)

which is made of a polymer of styrene or a derivative thereof, and block (b) which is made of an isoprene homopolymer or a copolymer of isoprene and butadiene, wherein the total amount of the 1,2-bonds and the 3,4-bonds in the isoprene polymer part in block (b) is not less than 40% of the total isoprene bond units;

component (B): 95 to 5% by weight of one or more thermoplastic elastomers which are selected from the group consisting thermoplastic polyester elastomers thermoplastic polyamide elastomers, and thermoplastic polyurethane elastomers, wherein said component (B) has a JIS Shore hardness (A Scale) of not more than 96 according to JIS-K6301, wherein said hydrogenated product has a hydrogenation degree of not less than 95% by weight.

2. A thermoplastic elastomer composition according to claim 1, wherein the total amount of the 1,2-bonds and the 3,4-bonds in the isoprene polymer part in said block (b) is not less than 45% of the total isoprene bonds units.

3. A thermoplastic elastomer composition according to claim 1, wherein the ratio of said block (a) in said component (A) is 10 to 45% by weight, and the ratio of said block (b) in said component (A) is 90 to 55% by weight.

4. A thermoplastic elastomer composition according to claim 1, wherein said component (B) is a thermoplastic polyester elastomer which has a bending modulus (according to JIS K-7203) of not more than 10,000, and a melting point by DSC (peak temperature) of not more than 230° C.

5. A thermoplastic elastomer composition according to claim 1, wherein said component (B) is a thermoplastic polyester elastomer which is an elastomer obtained by polycondensation of an aliphatic and/or alicyclic diol having 2 to 12 carbon atoms, an aromatic dicarboxylic acid or an alkyl ester thereof, and a polyalkylene ether glycol.

6. A thermoplastic elastomer composition according to claim 1, wherein said component (B) is a thermoplastic polyurethane elastomer which is an elastomer made of a hard segment block comprising a diisocyanate and a short-chain glycol, and a soft segment block comprising a diisocyanate and a long-chain polyol.

7. A thermoplastic elastomer composition according to claim 1, which contains said component (A) in an amount of 20 to 80% by weight and said component (B) in an amount of 80 to 20% by weight.

8. A thermoplastic elastomer composition according to claim 1, wherein said component (B) is a thermoplastic polyamide elastomer which is an elastomer made of a hard segment block comprising a polyamide and a soft segment block comprising a polyether or polyester.

9. A thermoplastic elastomer composition comprising the following components (A) and (B):

component (A): 5 to 95% by weight of a block copolymer or a hydrogenated product thereof, comprising block (a) which is made of a polymer of styrene or a derivative thereof, and block (b) which is made of an isoprene homopolymer or a copolymer of isoprene and butadiene, wherein the total amount of the 1,2-bonds and the 3,4-bonds in the isoprene polymer part in block (b) is not less than 40% of the total isoprene bond units;

component (B): 95 to 5% by weight of one or more thermoplastic elastomers which are selected from the group consisting of thermoplastic polyester elastomers, thermoplastic polyamide elastomers, and thermoplastic polyurethane elastomers, wherein said composition has a%ending modulus according to JIS-K7203 of 0 to 1,000 kg/cm$^2$.

10. A thermoplastic elastomer composition comprising the following components (A) and (B);

component (A): 5 to 95% by weight of a block copolymer or a hydrogenated product thereof, comprising block (a) which is made of a polymer of styrene or a derivative thereof, and block (b) which is made of an isoprene homopolymer or a copolymer of isoprene and butadiene, wherein the total amount of the 1,2-bonds and the 3,4-bonds in the isoprene polymer part in block (b) is not less than 40% of the total isoprene bond units;

component (B): 95 to 5% by weight of one or more thermoplastic elastomers which are selected from the group consisting of thermoplastic polyester elastomers, thermoplastic polyamide elastomers, and thermoplastic polyurethane elastomers, wherein said component (B) has a JIS Shore hardness (A Scale) of not more than 96 according to JIS-K6301 wherein said thermoplastic elastomer composition has a bending modulus according to JIS-K7203 of 0 to 1,000 kg/cm$^2$.

11. A thermoplastic elastomer composition according to claim 10 wherein said component (B) is a thermoplastic polyester elastomer which is an elastomer obtained by polycondensation of an aliphatic and/or alicyclic diol having 2 to 12 carbon atoms, an aromatic dicarboxylic acid or an alkyl ester thereof, and a polyalkylene ether glycol.

* * * * *